United States Patent
Nakai et al.

(10) Patent No.: US 9,842,450 B2
(45) Date of Patent: Dec. 12, 2017

(54) BANKNOTE HANDLING APPARATUS

(71) Applicant: GLORY LTD., Himeji-shi, Hyogo-ken (JP)

(72) Inventors: Kozen Nakai, Hunabashi (JP); Yoshiomi Nakashima, Tokyo-to (JP); Toshihide Asada, Himeji (JP); Shinji Matsuura, Tokyo (JP)

(73) Assignee: GLORY LTD., Himeji-shi, Hyogo-ken (JP)

( * ) Notice: Subject to any disclaimer, the term of this patent is extended or adjusted under 35 U.S.C. 154(b) by 0 days.

(21) Appl. No.: 15/231,809

(22) Filed: Aug. 9, 2016

(65) Prior Publication Data

US 2016/0350994 A1 Dec. 1, 2016

Related U.S. Application Data

(63) Continuation of application No. 14/396,073, filed as application No. PCT/JP2012/061418 on Apr. 27, 2012, now Pat. No. 9,430,894.

(51) Int. Cl.
*G07D 7/00* (2016.01)
*G06Q 40/02* (2012.01)
(Continued)

(52) U.S. Cl.
CPC ............ *G07D 7/00* (2013.01); *G06Q 20/18* (2013.01); *G06Q 40/02* (2013.01); *G07D 7/181* (2017.05)

(58) Field of Classification Search
CPC .......... G07D 7/00; G07D 7/18; G07D 7/182; G07D 7/185; G07D 7/187; G07D 7/2075;
(Continued)

(56) References Cited

U.S. PATENT DOCUMENTS 8,251,196 B2 * 8/2012 Dietz ................... G07D 7/00
194/206
2008/0289929 A1 * 11/2008 Wilfer .................. G07D 7/18
194/302

FOREIGN PATENT DOCUMENTS

CN 101965592 A 2/2011
EP 2 267 666 A1 * 12/2010 ............... G07D 7/00
JP 2002-197505 A 7/2002

OTHER PUBLICATIONS

Chinese Office Action with English Translation (Chinese Patent Application No. 201280072654.4) (11 pages—dated Mar. 15, 2017).

* cited by examiner

*Primary Examiner* — Mark Beauchaine
(74) *Attorney, Agent, or Firm* — Renner, Kenner, Greive, Bobak, Taylor & Weber

(57) ABSTRACT

A banknote handling apparatus 100 includes: a taking-in unit 10 which takes banknotes in one by one; a transport unit 70 which transports each banknote from the taking-in unit 10; a recognition sensor 20 which obtains information related to the fitness of the banknote transported by the transport unit 70; and a memory unit 55 which stores a threshold value for an unfit note factor for determining the fitness of a banknote. A control unit 50 of apparatus 100 determines the fitness of the banknote by comparing the threshold value and a detected value of the unfit note factor based on the information obtained by the recognition sensor 20, and counts the number of times the unfit note factor has been used to determine the banknote as an unfit note. An output unit 35 outputs the unfit note factor and the number of times of reason.

6 Claims, 6 Drawing Sheets

30a

| «FITNESS SETTING NAVIGATION» | | | | |
|---|---|---|---|---|
| SETTING_A | | | | |
| DEFECT1 | 150 | 0 | STAIN6 | 128 | 0 |
| DEFECT2 | 160 | 0 | STAIN7 | 128 | 0 |
| DEFECT3 | 128 | 0 | STAIN8 | 128 | 0 |
| DEFECT4 | 255 | 1 | STAIN9 | 128 | 0 |
| STAIN1 | 128 | 0 | THICKNESS1 | 128 | 0 |
| STAIN2 | 128 | 0 | THICKNESS2 | 128 | 0 |
| STAIN3 | 128 | 0 | FATIGUE1 | 255 | 0 |
| STAIN4 | 128 | 0 | FATIGUE2 | 255 | 3 |
| STAIN5 | 180 | 0 | | | |

30b

| DENOMI : 10000 | | UNFIT | | |
|---|---|---|---|---|
| SETTING_B | | | | |
| DEFECT1 | 100 | 0 | STAIN6 | 128 | 5 |
| DEFECT2 | 150 | 0 | STAIN7 | 128 | 99 |
| DEFECT3 | 128 | 0 | STAIN8 | 128 | 0 |
| DEFECT4 | 200 | 10 | STAIN9 | 128 | 0 |
| STAIN1 | 128 | 0 | THICKNESS1 | 128 | 42 |
| STAIN2 | 128 | 0 | THICKNESS2 | 128 | 33 |
| STAIN3 | 128 | 2 | FATIGUE1 | 128 | 51 |
| STAIN4 | 128 | 3 | FATIGUE2 | 128 | 5 |
| STAIN5 | 180 | 4 | | | |

(51) Int. Cl.
*G06Q 20/18* (2012.01)
*G07D 7/181* (2016.01)

(58) Field of Classification Search
CPC ..... G07D 7/2091; G07F 19/00; G07F 19/202; G06Q 20/18; G06Q 40/02
See application file for complete search history.

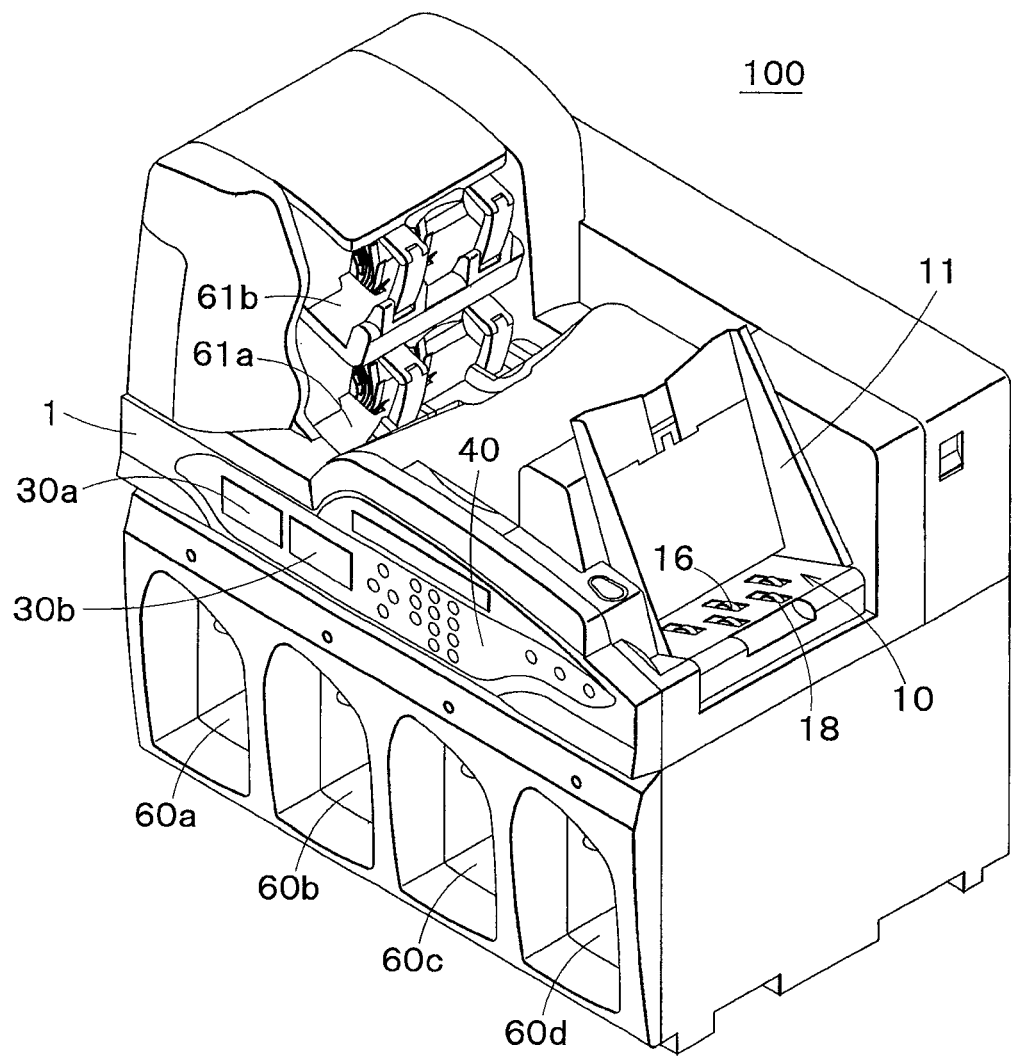
F I G. 1

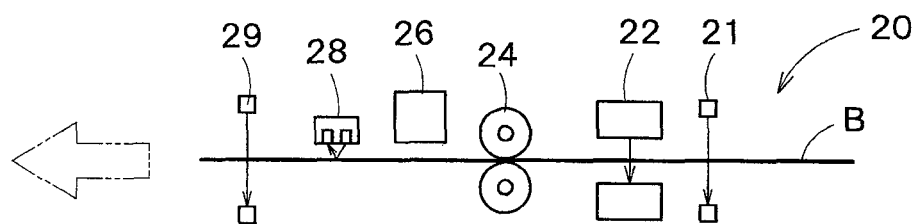
F I G. 3
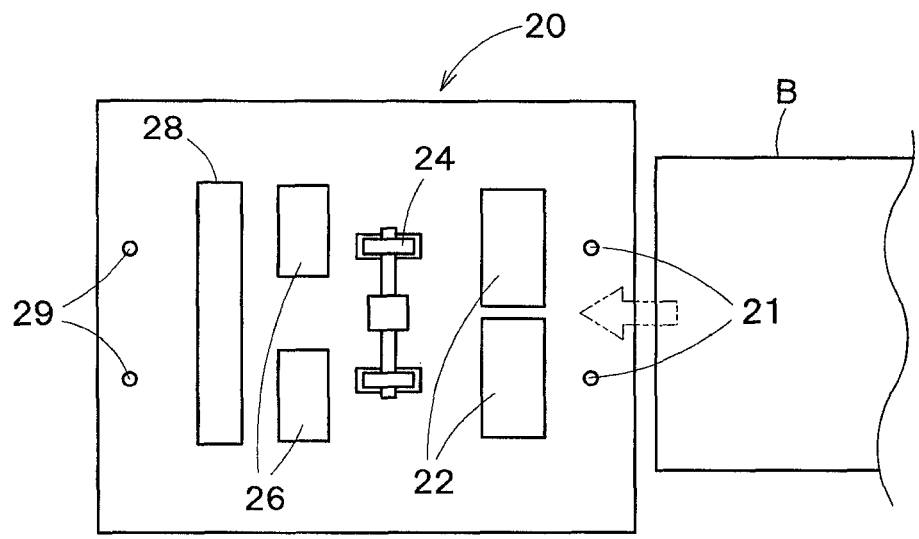
F I G. 4

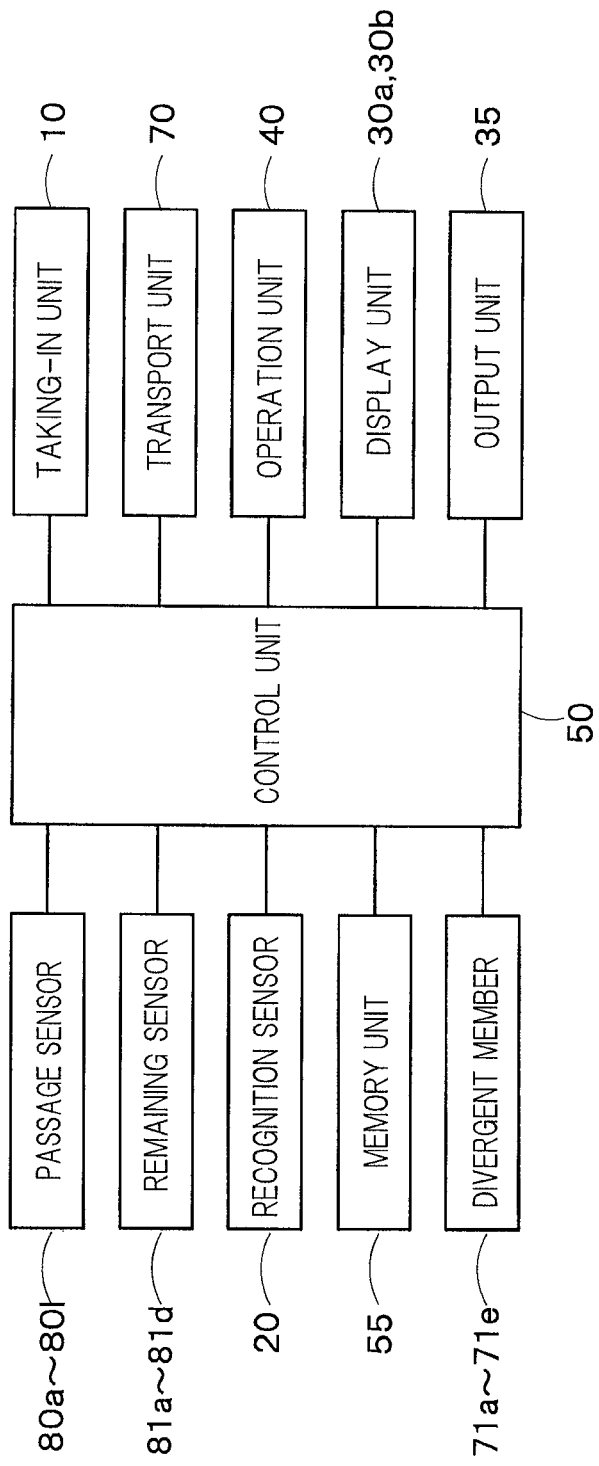
F I G. 5

《FITNESS SETTING NAVIGATION》

SETTING_A

| | | | |
|---|---|---|---|
| DEFECT1 | 150 | STAIN6 | 128 0 |
| DEFECT2 | 160 | STAIN7 | 128 0 |
| DEFECT3 | 128 | STAIN8 | 128 0 |
| DEFECT4 | 255 1 | STAIN9 | 128 0 |
| STAIN1 | 128 0 | THICKNESS1 | 128 0 |
| STAIN2 | 128 0 | THICKNESS2 | 255 0 |
| STAIN3 | 128 0 | FATIGUE1 | 255 0 |
| STAIN4 | 128 0 | FATIGUE2 | 180 3 |
| STAIN5 | 180 0 | | |

30b

DENOMI : 10000    UNFIT

SETTING_B

| | | | |
|---|---|---|---|
| DEFECT1 | 100 0 | STAIN6 | 128 5 |
| DEFECT2 | 150 0 | STAIN7 | 128 99 |
| DEFECT3 | 128 0 | STAIN8 | 128 0 |
| DEFECT4 | 200 10 | STAIN9 | 128 0 |
| STAIN1 | 128 0 | THICKNESS1 | 128 42 |
| STAIN2 | 128 0 | THICKNESS2 | 128 33 |
| STAIN3 | 128 2 | FATIGUE1 | 128 51 |
| STAIN4 | 128 3 | FATIGUE2 | 128 5 |
| STAIN5 | 180 4 | | |

| | | | | |
|---|---|---|---|---|
| DEFECT1A | 150 | 0 | DEFECT1B | 100 | 0 |
| DEFECT2 | 160 | 0 | DEFECT2 | 150 | 0 |
| DEFECT3 | 128 | 1 | DEFECT3 | 128 | 0 |
| DEFECT4 | 255 | 0 | DEFECT4 | 200 | 10 |
| STAIN1 | 128 | 0 | STAIN1 | 128 | 0 |
| STAIN2 | 128 | 0 | STAIN2 | 128 | 0 |
| STAIN3 | 128 | | STAIN3 | 128 | 2 |
| STAIN4 | 128 | | STAIN4 | 128 | 3 |

30a

《FITNESS SETTING NAVIGATION》

CURRENCY
DENOMI      10000
ATM CNT
TLR CNT
UNF CNT

BANKNOTE HANDLING APPARATUS

CROSS-REFERENCE TO RELATED APPLICATION

This application is a continuation of U.S. patent application Ser. No. 14/396,073 filed on Oct. 22, 2014, which is incorporated herein by reference, which was based upon and claimed the benefit of priority from the prior PCT/JP2012/061418 filed on Apr. 27, 2012, the entire contents of which are incorporated herein by reference.

TECHNICAL FIELD

The present invention relates to a banknote handling apparatus for determining at least the fitness of a banknote.

BACKGROUND ART

In a cash center or the like, there are performed an operation for returning unfit notes to a central bank and an operation for reusing fit banknotes. Since change instructions about an unfit note reference medium are provided from the central bank day by day, an operator changes a threshold value for determining the fitness of a banknote, and conducts a sorting process for a plurality of banknotes.

As a banknote handling apparatus for sorting banknotes, there is conventionally known a banknote handling apparatus including: a housing; a placement unit disposed on the housing for placing thereon a plurality of banknotes; a transport unit configured to transport each banknote that has been taken in the housing from the placement unit; a recognition sensor configured to obtain information related to the banknote transported by the transport unit; a stacking unit configured to stack banknotes transported thereto by the transport unit; a memory unit configured to store a threshold value for determining the fitness of a banknote; and a control unit configured to determine the fitness of a banknote by comparing the threshold value and a detected value, which is based on the information obtained by the recognition sensor.

Such a conventional banknote handling apparatus can determine the fitness of a banknote. However, when the fitness of a plurality of banknotes is determined, it cannot be known which unfit note factor is a main reason for the large or small number of banknotes that have been determined as unfit notes. Thus, when the number of banknotes to be determined as an unfit note is changed, for example, it is necessary for an operator to change a threshold value of a specific unfit note factor at a guess among threshold values stored in the memory unit, and then to actually preform again a banknote sorting process. In some cases, such an operation for changing a threshold value for a specific unfit note factor and such a banknote sorting process should be repeated plural times. Thus, it is difficult for the conventional banknote handling apparatus to suitably change the number of banknotes to be determined as an unfit note, and it takes a long time therefor.

There is known a banknote handling apparatus that recognizes each banknote by comparing plural types of detected values, which are detected for the banknote, and a threshold value, which is stored in a memory unit (see WO2009/118857). However, the banknote handling apparatus described in WO2009/118857 is an apparatus for displaying a reject reason and a detected value of one banknote. Thus, even by using the banknote handling apparatus described in WO2009/118857, when the fitness of a plurality of banknotes is determined, it cannot be also known which unfit note factor is a main reason for the large or small number of banknotes that have been determined as unfit notes.

DISCLOSURE OF THE INVENTION

In view of the above circumstances, the present invention provides a banknote handling apparatus by which an operator can easily know, when the fitness of a plurality of banknotes is determined, which unfit note factor is a main reason for the large or small number of banknotes that have been determined as unfit notes.

The banknote handling apparatus of the present invention comprises:

a taking-in unit configured to take banknotes in one by one;

a transport unit configured to transport each banknote having been taken in from the taking-in unit;

a recognition sensor configured to obtain information related at least to fitness of the banknote transported by the transport unit;

a memory unit configured to store a threshold value for an unfit note factor for determining the fitness of the banknote; and a control unit configured to determine the fitness of the banknote by comparing the threshold value and a detected value of the unfit note factor based on the information obtained by the recognition sensor, and configured to count a number of times of reason for each unfit note factor, which is a number of times the unfit note factor has been used to determine the banknote as an unfit note; and an output unit configured to output the unfit note factor and the number of times of reason.

In the banknote handling apparatus of the present invention, the output unit may be configured to output the threshold value.

In the banknote handling apparatus of the present invention, the memory unit may be configured to store two threshold values for at least one unfit note factor;

the control unit may be configured to determine the fitness of the banknote by comparing, as to the unfit note factor for which the two threshold values are stored in the memory unit, each threshold value and the detected value of the unfit note factor based on the information obtained by the recognition sensor, and be configured to count the number of times of reason for each threshold value; and the output unit may be configured to output, as to the unfit note factor for which the two threshold values are stored in the memory unit, the number of times of reason for each threshold value.

The banknote handling apparatus of the present invention may further include a threshold-value changing unit configured to change the threshold value for each unfit note factor.

In the banknote handling apparatus of the present invention, the threshold value for each unfit note factor may be changeable;

the memory unit may be configured to store the information related to the fitness of the banknote obtained by the recognition sensor;

the control unit may be configured to determine the fitness of the banknote by comparing at least the changed threshold value and a detected value of an unfit note factor corresponding to the changed threshold value among the detected values based on the information related to the fitness of the banknote stored in the memory unit, and be configured to calculate the number of times of reason for at least the unfit note factor for which the threshold value is changed; and the output unit may be configured to output the number of times of reason for at least the unfit note factor for which the threshold value is changed.

The banknote handling apparatus of the present invention may further include a display unit configured to display the unfit note factor and the number of times of reason, and configured to change an output manner for the unfit note factor based on information of the number of times of reason.

According to the present invention, the control unit is configured to determine the fitness of a banknote by comparing a threshold value for an unfit note factor and a detected value, and is configured to count the number of times of reason for each unfit note factor, which is a number of times the unfit note factor has been used to determine the banknote as an unfit note. Thus, an operator can easily know, when the fitness of a plurality of banknotes is determined, which unfit note factor is a main reason for the large or small number of banknotes that have been determined as unfit notes.

BRIEF DESCRIPTION OF THE DRAWINGS

FIG. 1 is a perspective view of a banknote handling apparatus according to an embodiment of the present invention.

FIG. 3 is a longitudinal sectional view schematically showing a structure of a recognition sensor shown in FIG. 2.

FIG. 4 is a top plan view schematically showing the structure of the recognition sensor shown in FIG. 2.

FIG. 5 is a control block view of the banknote handling apparatus according to the embodiment of the present invention.

FIG. 6 is a view showing an example of contents displayed on a display unit of the banknote handling apparatus according to the embodiment of the present invention.

FIG. 7 is a view showing another example of contents displayed on the display unit of the banknote handling apparatus according to the embodiment of the present invention.

MODE FOR CARRYING OUT THE INVENTION

Embodiment

<<Structure>>

Figure 2:
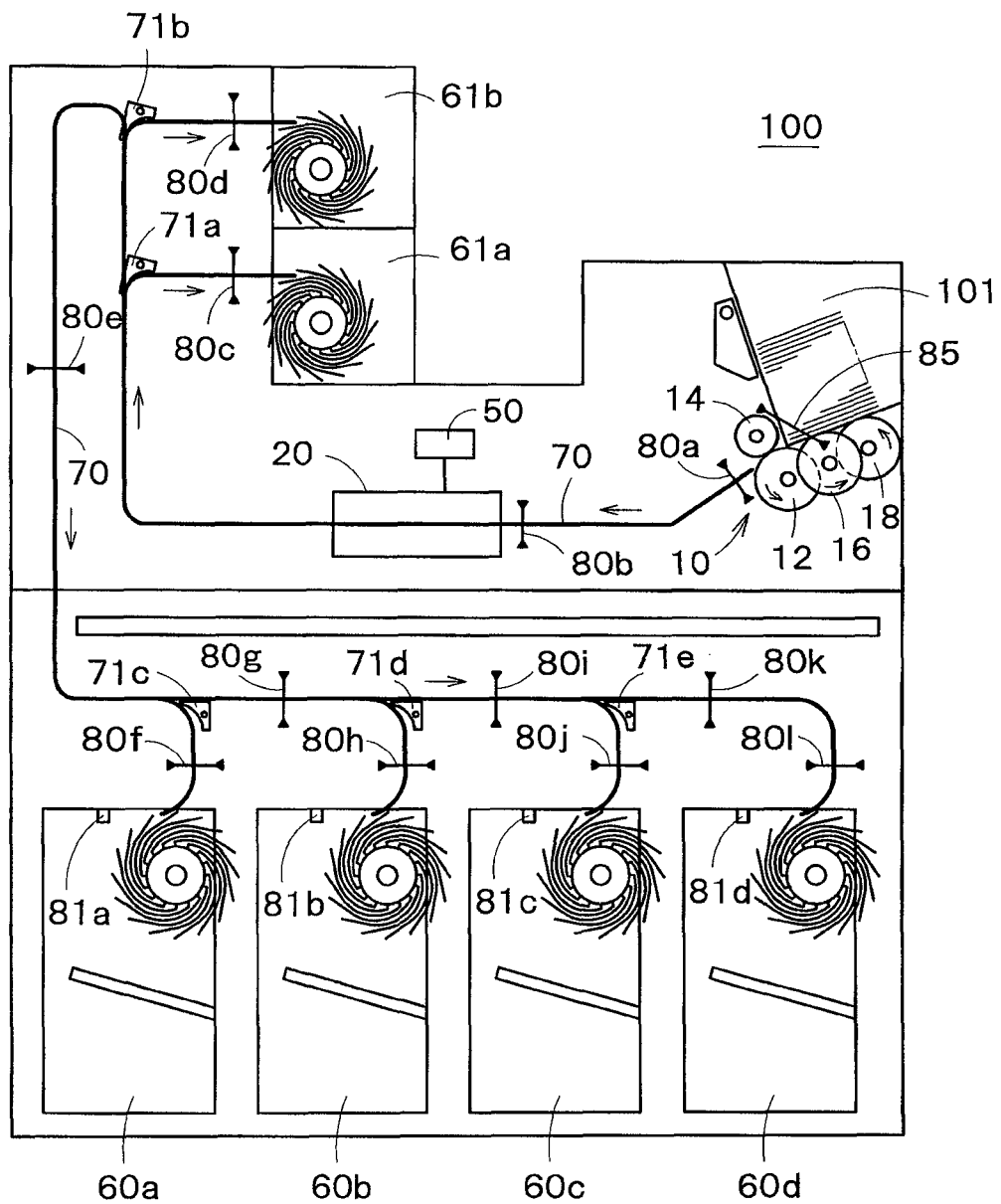
FIG. 2 is a longitudinal sectional view schematically showing an inside structure of the banknote handling apparatus according to the embodiment.

An embodiment of a banknote handling apparatus according to the present invention will be described hereinbelow with reference to the drawings. FIGS. 1 to 7 are views for explaining the embodiment of the present invention.

As shown in FIG. 1, a banknote handling apparatus 100 in this embodiment includes: a housing 1; a placement unit 11 disposed on the housing 1 for placing thereon a plurality of banknotes; a taking-in unit 10 configured to take banknotes, one by one, placed on the placement unit 11, in the housing 1; a transport unit 70 (see FIG. 2) configured to transport each banknote having been taken from the taking-in unit 10 in the housing 1; a plurality of stacking units 60a to 60d configured to stack the banknotes transported thereto by the transport unit 70; and reject units 61a and 61b configured to reject a banknote that is not stacked in any of the stacking units 60a to 60d.

As shown in FIG. 2, the aforementioned taking-in unit 10 is provided with kicker rollers 16 and 18, which are disposed on the placement unit 11 and are configured to give a driving force to a banknote located on a lowest position, and gate mechanisms 12 and 14, which are configured to sandwich therebetween the banknote to which a driving force has been given by the kicker rollers 16 and 18 and to send the banknote into the housing 1. The gate mechanisms 12 and 14 include a feed roller 12 and a gate roller 14 disposed oppositely to the feed roller 12.

The placement unit 11 is equipped with an existence sensor 85 for detecting whether a banknote is placed on the placement unit 11. The transport unit 70 is equipped with a plurality of passage sensors 80a to 80l for detecting whether a banknote has passed through the transport unit 70. The respective stacking units 60a to 60d are equipped with remaining sensors 81a to 81d for detecting a stacking condition of banknote(s).

In addition, the transport unit 70 is equipped with a plurality of divergent members 71a to 71e configured to suitably diverge banknotes transported by the transport unit 70.

As shown in FIG. 5, the banknote handling apparatus 100 includes a recognition sensor 20 (see FIG. 2) configured to obtain information related at least to the fitness of a banknote transported by the transport unit 70, a memory unit 55 configured to store a threshold value for an unfit note factor for determining the fitness of a banknote, a control unit 50 (see FIG. 2) configured to determine the fitness of the banknote by comparing the threshold value and a detected value of the unfit note factor based on the information obtained by the recognition sensor 20, and configured to count the number of times of reason for each unfit note factor, and an output unit 35 configured to output, to display units 30a and 30b which will be described later, the unfit note factor, the threshold value for each unfit note factor, and the number of times of reason for each unfit note factor. The above "number of times of reason" means the number of times the unfit note factor has been used to determine the banknote as an unfit note.

The recognition sensor 20 in this embodiment is configured to obtain information related to a version of a banknote, an authenticity thereof, a denomination thereof, a direction thereof, a face/back thereof, a transport condition thereof and so on. Based on the information related to a version of a banknote, an authenticity thereof, a denomination thereof, a direction thereof, a face/back thereof, a transport condition thereof and so on, the control unit 50 can recognize a banknote(s) taken in by the taking-in unit 10 and stack the banknote in(s) the stacking units 60a to 60d.

Although this embodiment is explained by giving an example in which the threshold value takes 0 to 255, of course the threshold value is not limited to 0 to 255 and may take another range. In addition, although this embodiment is explained by giving an example in which, when a detected value of a banknote is not less than the threshold value, the banknote is determined as a fit banknote, while when a detected value a banknote is less than the threshold value, the banknote is determined as an unfit note, the present invention is not limited thereto. There may be employed an embodiment in which, when a detected value of a banknote is larger than the threshold value, the banknote is determined as an unfit note.

As shown in FIGS. 3 and 4, the above-described recognition sensor 20 includes an infrared light sensor 22 configured to obtain information related to a banknote by using infrared light, a thickness detection sensor 24 configured to detect a thickness of a banknote, a magnetic sensor 26 configured to obtain information related to a banknote by using magnetism, and a red light sensor 28 configured to obtain information related to a banknote by using red light. Timing sensors 21 and 29 configured to detect arrival of a banknote are disposed on an upstream side of the infrared light sensor 22 and a downstream side of the red light sensor 28, respectively. In FIGS. 3 and 4, an object indicated by the reference number B is a banknote transported in the recognition sensor 20. The two-dot chain line arrow depicts a transport direction of the banknote B. The structure of the recognition sensor 20 can be suitably changed depending on information to be obtained. For example, in place of the infrared light sensor 22, there may be disposed a line sensor configured to detect reflected light and transmitted light on both sides of a banknote by means of red light and green light. In addition, an ultraviolet light sensor maybe disposed in place of the infrared light sensor 22. In addition, the thickness detection sensor 24 and the magnetic sensor may be a sensor having a length capable of detecting an overall width perpendicular to the banknote transport direction.

As shown in FIG. 1, at the housing 1 of the banknote handling apparatus 100, an operation unit 40 having an input button for receiving an instruction from an operator, and the display units 30*a* and 30*b*, which are configured to display information outputted from the output unit 35 such as an unfit note factor, the number of times of reason and so on, are provided. The display units 30*a* and 30*b* include a first display unit 30*a* and a second display unit 30*b* disposed adjacent to the first display unit 30a. These first display unit 30*a* and the second display unit 30*b* are for example LCD display units. In this embodiment, a display manner of an unfit note factor is changed based on information of the number of times of reason. For example, an unfit note factor having the largest number of times of reason is emphatically displayed (e.g., blinkingly displayed).

In addition to the embodiment in which the banknote handling apparatus 100 includes the display units 30*a* and 30*b*, there may be employed an embodiment in which a display unit etc. of an external apparatus, such as a personal computer, constitutes the display unit, and a banknote handling system includes the display unit.

In FIG. 6, "DEFECT1", "DEFECT2", "DEFECT3", "DEFECT4", "STAIN 1", "STAIN 2", "STAIN 3", "STAIN4", "STAIN 5", "STAIN6", "STAIN7", "STAIN8", "STAIN9", "THICKNESS1", "THICKNESS2", "FATIGUE1" and "FATITUE2" shown in the display units 30*a* and 30*b* are unfit note factors. Although not described herein in detail, "DEFECT1", "DEFECT2", "DEFECT3" and "DEFECT4" are unfit note factors relating to a defect. "STAIN1", "STAIN2", "STAIN3", "STAIN4", "STAINS", "STAIN6", "STAIN7", "STAIN8" and "STAIN9" are unfit note factors relating to a stain. "THICKNESS1" and "THICKNESS2" are unfit note factors relating to a thickness of a banknote. "FATIGUE1" and "FATITUE2" are unfit note factors relating to a material fatigue of a banknote.

The memory unit 55 (see FIG. 5) in this embodiment is configured to store two threshold values for at least one unfit note factor. As to the unfit note factor for which two threshold values are stored in the memory unit 55, the control unit 50 is configured to determine the fitness of a banknote by comparing each threshold value (i.e., each of the two threshold values) and a detected value of the unfit note factor based on information obtained by the recognition sensor, and is configured to count the number of times of reason for each threshold value. Note that, although the term "two threshold values" is used in the claims, more than two threshold values, e.g., three threshold values, four threshold values and so on belong to the "technical scope" of the term "two threshold values".

As to the unfit note factor for which two threshold values are stored in the memory unit 55, the output unit 35 is configured to output each threshold value and the number of times of reason for each threshold value. The display units 30*a* and 30*b* are configured to display each threshold value and the number of times of reason for each threshold value.

The present invention is explained with a concrete example. In the embodiment shown in FIG. 6, two threshold values are stored in the memory unit 55 for each of "DEFECT1", "DEFECT2", "DEFECT4", "FATIGUE1" and "FATITUE2". Namely, threshold values "150" and "100" are stored for "DEFECT1". Threshold values "160" and "150" are stored for "DEFECT2". Threshold values "255" and "200" are stored for "DEFECT4". Threshold values "255" and "128" are stored for "FATIGUE1". Threshold values "255" and "128" are stored for "FATIGUE2". As to these "DEFECT1", "DEFECT2", "DEFECT4","FATIGUE1" and "FATITUE2", the fitness of a banknote is determined by comparing each of the aforementioned two threshold values and a detected value of each of "DEFECT1", "DEFECT2", "DEFECT4","FATIGUE1" and "FATITUE2" based on information obtained by the recognition sensor 20, and the number of times of reason is counted for each threshold value.

In the embodiment shown in FIG. 6, the first display unit 30*a* displays strict threshold values (larger threshold values in this embodiment) and the display unit 30*b* displays permissive threshold values (smaller threshold values in this embodiment). As to the number of times of reason which is not determined by using the two threshold values, the same threshold value is displayed on the first display unit 30*a* and the second display unit 30*b*, respectively.

In addition, the second display unit 30*b* displays the number of times of reason when a detected value is compared to a permissive threshold value. For example, the second display 30*b* displays the number of times at which a banknote is determined as a banknote that cannot be used in an ATM installed in a financial facility such as a bank, and also cannot be used in a reception of a financial facility such as a bank (so-called "UNFIT"). On the other hand, the first display unit 30*a* displays a difference obtained by deducting the number of times of reason when a detected value is compared to a permissive threshold value, from the number of times of reason when a detected value is compared to a strict threshold value. For example, the first display unit 30*a* displays the number of times at which a banknote is determined as a banknote that cannot be used in an ATM installed in a financial facility such as a bank but can be used in a reception of a financial facility such as a bank (so-called "Teller-FIT").

Various embodiments can be considered as embodiments to be displayed on the first display unit 30*a* and the second display unit 30*b*. As an example different from the example shown in FIG. 6, an embodiment shown in FIG. 7 can be employed, for example. In the embodiment shown in FIG. 7, the second display unit 30*b* displays both the strict threshold values (larger threshold values in this embodiment) and the permissive threshold values (smaller threshold values in this embodiment). As to the number of times of reason which is not determined by using two threshold values, the same threshold value is displayed overlappingly. Meanwhile, the second display unit 30*b* displays the number of times of reason at which a detected value is compared to a permissive threshold value, and a difference obtained by deducting the number of times of reason at which a detected value is compared to a permissive threshold value from the number of times of reason at which a detected value is compared to a strict threshold value. On the other hand, the fitness of a banknote is determined based on the fitness determination result obtained by comparing a threshold value and a detected value of each unfit note factor of each banknote, and the display unit 30*a* displays the number of fit notes and the number of unfit notes of all the determined banknotes. For example, "ATM CNT" in FIG. 7 shows the number of banknote(s) which is(are) determined as a fit note in comparison with the strict threshold values for all unfit note factors (e.g., the number of banknotes which are determined as "ATM FIT"). In addition, "TLR CNT" in FIG. 7 shows the number of banknote(s) for which there is(are) one or more unfit note factors based on which the banknote is determined as an unfit note in comparison with the strict threshold values but is determined as a fit note in comparison with the permissive threshold values, but for which there is not any unfit note factor based on which the banknote is determined as an unfit note in comparison with the permissive threshold values (e.g., the number of banknotes which are determined as "Teller FIT"). In addition, "UNF CNT" in FIG. 7 shows the number of banknote(s) for which there is(are) one or more unfit note factors based on which the banknote is determined as an unfit note in comparison with the permissive threshold values (e.g., the number of banknotes which are determined as "UNFIT"). The first display unit 30*a* may display a type a currency banknote, a denomination thereof a detailed fitness type, etc. In addition, the procedure for determining the fitness of a certain banknote by using a fitness determination result for each unfit note factor of the banknote can be suitably changed. For example, when there are three or more unfit note factors based on which a banknote is determined as an unfit note in comparison with the permissive threshold values, the banknote may be determined as an unfit note ("UNFIT"). The fitness of a banknote may be determined by weighting each unfit note factor.

In addition, the banknote handling apparatus 100 further includes a threshold-value changing unit configured to change threshold values for each unfit note factor. In this embodiment, the display units 30*a* and 30*b* being as touch panels constitute the threshold-value changing unit. In addition to this embodiment in which the banknote handling apparatus 100 includes the threshold-value changing unit (display units 30*a* and 30*b* in this embodiment), there may be employed an example in which an external apparatus such as a personal computer functions as the threshold-value changing unit, and a banknote handling system includes the threshold-value changing unit.

The memory unit 55 may store information related to the fitness of a banknote obtained by the recognition sensor 20. The control unit 50 may determine the fitness of the banknote by comparing a threshold value which is changed through the display units (threshold-value changing unit) 30*a* and 30*b*, and a detected value of an unfit note factor corresponding to the changed threshold value among detected values based on the information related to the fitness of the banknote stored in the memory unit 55, and may calculate the number of times of reason of the unfit note factor for which the threshold value is changed. In this case, the output unit 35 outputs the number of times of reason for at least the unfit note factor for which the threshold value is changed, and the display units 30*a* and 30*b* display the number of times of reason outputted from the output unit 35.

<<Operation/Effect>>

Next, an operation and an effect of the embodiment as structured above are explained.

According to this embodiment, the control unit 50 determines the fitness of a banknote by comparing a threshold value for an unfit note factor, which is stored in the memory unit 55, and a detected value of the unfit note factor based on information obtained by the recognition sensor 20, and counts the number of times of reason for each unfit note factor. Then, the output unit 35 outputs the unfit note factor and the number of times of reason, and the display units 30*a* and 30*b* display the number of times of reason outputted from the output unit 35.

Thus, according to this embodiment, when the fitness of a plurality of banknotes is determined, an operator can easily know which unfit note factor is a main reason for the large or small number of banknotes that have been determined as unfit notes. Therefore, as compared with a conventional banknote handling apparatus, the present invention can provide an advantageous effect.

Namely, in the conventional banknote handling apparatus, it cannot be known at all which unfit note factor is a main reason for the large or small number of banknotes that have been determined as unfit notes. Thus, when the number of banknotes to be determined as an unfit note is changed, for example, it is necessary for an operator to change a threshold value for a specific unfit note factor at a guess among threshold values stored in the memory unit, and then to actually preform again a banknote sorting process. In some cases, such an operation for changing a threshold value for a specific unfit note factor and a banknote sorting process should be repeated plural times. Thus, it is difficult for the conventional banknote handling apparatus to suitably change the number of banknotes to be determined as an unfit note, and it takes a long time therefor.

On the other hand, according to the banknote handling apparatus in this embodiment, the control unit 50 is configured to count the number of times of reason for each unfit note factor, the output unit 35 is configured to output the unfit note factors and the number of times of reason, and the display units 30*a* and 30*b* are configured to display the unfit note factors and the number of times of reason. Thus, when the fitness of a plurality of banknotes is determined, an operator can easily know which unfit note factor is a main reason for the large or small number of banknotes that have been determined as unfit notes.

Further, in this embodiment, there are provided the display units 30*a* and 30*b* functioning as the threshold-value changing unit configured to change a threshold value for each unfit note factor. Thus, an operator can easily change a threshold value for the unfit note factor, which is a main reason, through the display units 30*a* and 30*b*, and also easily can change the number of banknotes to be determined as an unfit note.

In addition, according to this embodiment, the output unit 35 is configured to output a threshold value for each unfit note factor, and the display units 30*a* and 30*b* are configured to display the threshold value. Thus, an operator can confirm the threshold value set for each unfit note factor displayed on the display units 30*a* and 30*b*, and can refer to the threshold value when changing a threshold value. As a result, changing a threshold value by an operator can be further facilitated.

In addition, according to this embodiment, as to at least one unfit note factor for which two threshold values are stored in the memory unit 55, the control unit 50 is configured to determine the fitness of a banknote by comparing each threshold value and a detected value, and is configured to count the number of times of reason for each threshold value. In addition, as to the unfit note factor for which the two threshold values are stored in the memory unit 55, the output unit 35 is configured to output the number of times of reason for each threshold value, and the display units 30*a* and 30*b* are configured to display the number of times of reason for each threshold value outputted from the output unit 35.

Therefore, according to this embodiment, as to an unfit note factor for which two threshold values are set, an operator can know the number of times of reason for each of the two threshold values. Thus, for example, an operator can suitably know which unfit note factor is a main reason for unfit notes determined as banknotes that cannot be used in an ATM installed in a financial facility such as a bank and also cannot be used in a reception of a financial facility such as a bank (so-called "UNFIT"). At the same time, the operator can suitably know which unfit note factor is a main reason for unfit notes determined as banknotes that cannot be used in an ATM installed in a financial facility such as a bank but can be used in a reception of a financial facility such as a bank (so-called "Teller-FIT").

In addition, in this embodiment, a display manner of an unfit note factor is changed based on information of the number of times of reason. For example, an unfit note factor having the largest number of times of reason is emphatically displayed (e.g., blinkingly displayed). Thus, it is more easy for an operator to know which unfit note factor is a main reason for the large or small number of banknotes that have been determined as unfit notes, without mistake.

According to the embodiment in which the memory unit 55 is configured to store information related to the fitness of a banknote obtained by the recognition sensor 20, the control unit 50 is configured to determine the fitness of the banknote by comparing a threshold value which has been changed by the display units (threshold-value changing unit) 30*a* and 30*b*, and a detected value of an unfit note factor corresponding to the changed threshold value, and is configured to count the number of times of reason for the unfit note factor for which the threshold value is changed; the fitness of a banknote whose detected value has been already obtained can be determined and the number of times of reason can be calculated, only by changing a threshold value through the display units 30*a* and 30*b* without actually detecting again a detected value of the banknote. Therefore, an operator can know the number of times of reason for the changed unfit note factor, without actually taking a banknote in the banknote handling apparatus 100, whereby a suitable threshold value can be set more easily and more promptly.

The above-described embodiment and the disclosure of the drawings are nothing more than an example for explaining the inventions recited in the claims. The inventions recited in the claims should not be limited by the above-described embodiment and the disclosure of the drawings.

What is claimed is:

1. A banknote handling apparatus comprising:
   a taking-in unit that takes banknotes in one by one;
   a transport unit that transports each banknote having been taken in from the taking-in unit;
   a recognition sensor that obtains information related at least to fitness of the banknote transported by the transport unit;
   a memory unit that stores a threshold value for an unfit note factor for determining the fitness of the banknote; and
   a control unit,
   wherein the control unit determines the fitness of the banknote on the basis of the threshold value and the information obtained by the recognition sensor,
   wherein the control unit counts a number of times of reason for each unfit note factor, which is a number of times the unfit note factor has been used to determine the banknote as an unfit note, and
   wherein the control unit controls displaying the unfit note factor and the number of times of reason on a display unit, and controls changing a display manner for the unfit note factor on the display unit based on information of the number of times of reason.

2. The banknote handling apparatus according to claim 1, wherein the control unit controls displaying the unfit note factor emphatically on a display unit, based on the number of times of reason.

3. The banknote handling apparatus according to claim 2, wherein the control unit is configured to control displaying the unfit note factor having the largest number of times of reason emphatically on a display unit.

4. The banknote handling apparatus according to claim 1, wherein:
   the memory unit is configured to store plural threshold values for one unfit note factor; and
   the control unit is configured to count the number of times of reason for each threshold value, as to the unfit note factor for which the plural threshold values are stored in the memory unit.

5. The banknote handling apparatus according to claim 1, further comprising a threshold-value changing unit configured to change the threshold value for each unfit note factor.

6. The banknote handling apparatus according to claim 1, wherein:
   the threshold value for each unfit note factor is changeable;
   the control unit determines the fitness of the banknote on the basis of the changed threshold value and the obtained information of an unfit note factor corresponding to the changed threshold value;
   the control unit calculates the number of times of reason for the unfit note factor for which the threshold value is changed; and
   the control unit controls displaying the calculated number of times of reason for the unfit note factor for which the threshold value is changed.

\* \* \* \* \*